United States Patent [19]

Sasaki

[11] Patent Number: 4,953,942
[45] Date of Patent: Sep. 4, 1990

[54] OPTICAL FIBER CABLE AND METHOD OF MAKING THE SAME
[75] Inventor: Kazuya Sasaki, Mitaka, Japan
[73] Assignee: Fujitsu Limited, Kawasaki, Japan
[21] Appl. No.: 332,733
[22] Filed: Apr. 4, 1989
[30] Foreign Application Priority Data
  Apr. 8, 1988 [JP] Japan .................. 63-087633
[51] Int. Cl.⁵ .............. G02B 6/44; D02G 3/36; B21D 3/00
[52] U.S. Cl. .................. 350/96.23; 350/320; 57/5; 57/14; 57/270; 72/352; 72/367; 72/371
[58] Field of Search .................. 350/96.23, 320; 57/5, 57/14, 270; 72/343, 352, 367, 368, 371

[56] References Cited
U.S. PATENT DOCUMENTS 4,235,511 11/1980 Yonechi ........................... 350/96.23
4,257,675 3/1981 Nakagome et al. ............... 350/96.23
4,826,279 5/1989 Nishimura et al. .............. 350/96.23
4,904,321 2/1990 Harvey ............................ 350/96.23

FOREIGN PATENT DOCUMENTS 50-102217 2/1977 Japan ........................... 350/96.23 X
50-102218 2/1977 Japan ........................... 350/96.23 X Primary Examiner—Brian Nealy
Attorney, Agent, or Firm—Staas & Halsey

[57] ABSTRACT

A spacer-type optical fiber cable has a rod-type spacer which includes closed spaces for holding corresponding optical fibers within these closed spaces. The closed spaces of the rod-type spacer are formed from open straight grooves on a flat-type spacer and then transforming the flat-type spacer into a circular rod-type spacer during a sequence of manufacturing steps, one step using a tapered die to perform the spacer transformation.

20 Claims, 5 Drawing Sheets

FIG. 4A
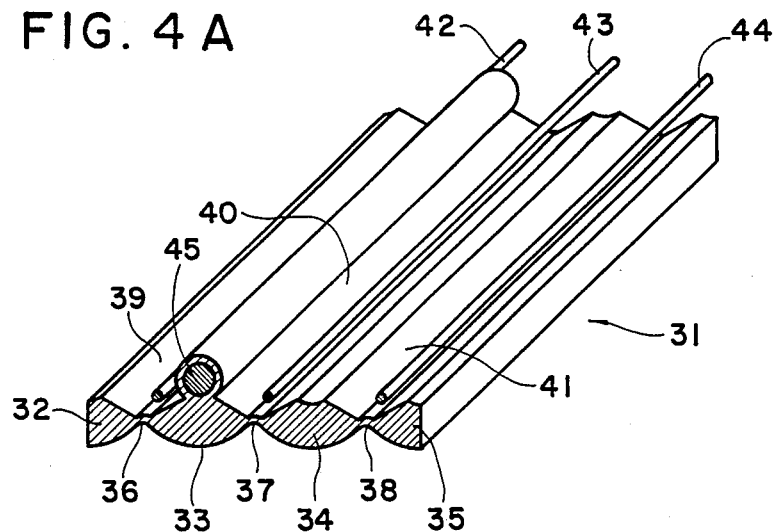
FIG. 4B
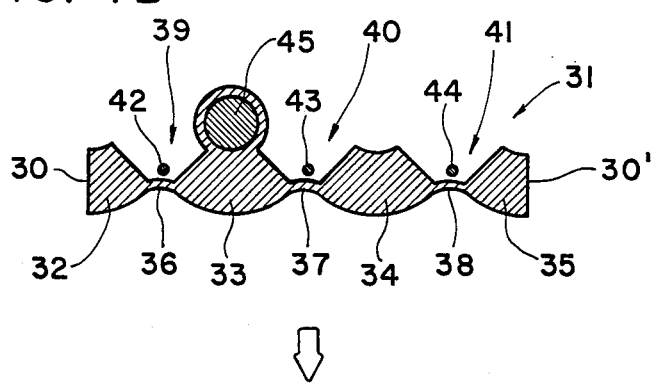
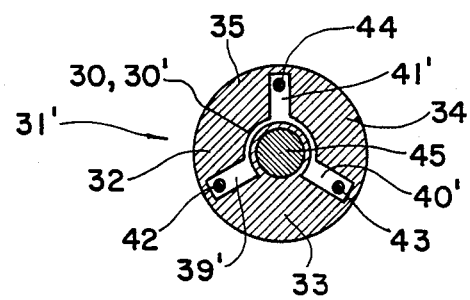
FIG. 4C

OPTICAL FIBER CABLE AND METHOD OF MAKING THE SAME

BACKGROUND OF THE INVENTION

The present invention relates to an optical fiber cable and a method of making it, and more specifically, to a spacer-type optical fiber cable for holding optical fibers in closed spaces provided by a spacer.

One of the problems associated with an optical fiber cable is protecting the optical fibers within the cable from external forces, such as tension, lateral pressure, bending forces and contractile forces caused by temperature changes. These external forces acting against the optical fibers can cause degradation of the transmitting and mechanical characteristics of the fibers.

In an effort to solve the above problems, a "spacer-type" optical fiber cable is known and is considered one of the better structures for this purpose. A spacer-type optical fiber cable usually includes a rod-type spacer provided on its surface with open grooves for loosely holding optical fibers, one or more tension members as a center core of the rod-type spacer, a plurality of optical fibers positionable along the grooves, a tape placed over the rod-type spacer with the fibers therein, and an outer sheath.

As is known, an optical fiber cable is wound around a reel as the last step of its manufacturing process, which reel of cable is then shipped as the finished cable product. Thus, the cable subsequently has to be released from the reel and the cable stretched when using it as a practical communication line. As a result, the optical fibers held in the optical fiber cable receive significant bending stresses.

To deal with such bending stresses, each of the optical fibers is held in the optical fiber cable so as to be positioned in a spiral path along the longitudinal axis of the cable. Thus, the bending stress against each of them can be equalized, and it becomes possible to prevent the fibers from producing differences among each of their transmitting and mechanical characteristics. Therefore, in the prior art, the rod-type spacer of a spacer-type optical fiber cable has on its surface open spiral grooves for holding the optical fibers, so that each of the optical fibers, as mentioned above, is positioned in a spiral along the rod-type spacer's longitudinal axis.

This spacer-type optical fiber cable, however, continues to have problems with it. Namely, continuously arranging the optical fibers in the spiral grooves of the rod-type spacer of the cable in a manufacturing line requires large and complicated mechanisms, especially during the manufacturing step of providing the plurality of optical fibers to the rod-type spacer.

SUMMARY OF THE INVENTION

Therefore, it is a primary object of this invention to provide a spacer-type optical fiber cable which can be manufactured by simple and small manufacturing mechanisms.

Another object of this invention is to provide a simpler, less costly method of manufacturing a spacer-type optical fiber cable.

In a preferred embodiment of the invention for an optical fiber cable, the optical fiber cable comprises (1) a plurality of optical fibers, and (2) spacer means for holding and protecting the optical fibers in closed spaces, the spacer means including a plurality of section blocks connected together to form a plurality of closed spaces between adjacent blocks in which the optical fibers are positioned.

In the preferred embodiment, a tension member is formed within a portion of one of the blocks for final positioning in the center of the spacer means. A circular rod-type spacer having the closed spaces is created by transforming a plurality of open grooves on a flat-type spacer comprising the plurality of section blocks into the rod-type spacer.

In a preferred embodiment of the invention for manufacturing an optical fiber cable, the method of making an optical fiber cable comprises the steps of (1) providing a flat-type spacer having a straight groove along a length thereof and positioning an optical fiber therein along substantially the same plane; and (2) forming the straight groove into a closed space in which the optical fiber is held, by transforming the flat-type spacer into a circular rod-type spacer while the optical fiber remains positioned in the groove. Preferably, after the forming step (2), there is included the step of twisting the rod-type spacer so that the optical fiber takes a spiral-like path along the longitudinal length of the rod-type spacer.

These objects, together with other objects and advantages of the invention which will be subsequently apparent, reside in the details of construction of the cable and the steps of the manufacturing method for the cable as more fully hereinafter described and claimed, reference being had to the accompanying drawings forming a part hereof, wherein like reference numerals refer to like parts throughout.

BRIEF DESCRIPTION OF THE DRAWINGS

FIG. 4A is a perspective view of a flat-type spacer for the optical fiber cable in accordance with this invention;

FIG. 4B is a cross-sectional view of the flat-type spacer shown in FIG. 4A for the optical fiber cable in accordance with this invention;

FIG. 4C is a cross-sectional view of a modified rod-type spacer made from the flat-type spacer shown in FIGS. 4A and 4B for the optical fiber cable in accordance with this invention;

DETAILED DESCRIPTION OF THE PREFERRED EMBODIMENTS

Before describing the preferred embodiments of the present invention, it is helpful to review the prior art method of manufacturing a spacer-type optical fiber cable.

Figure 1A:
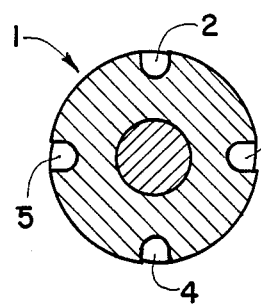
FIGS. 1A and 1B are respectively a cross-sectional view and a side view of the prior art rod-type spacer included in a spacer-type optical fiber cable.
Figure 1B:
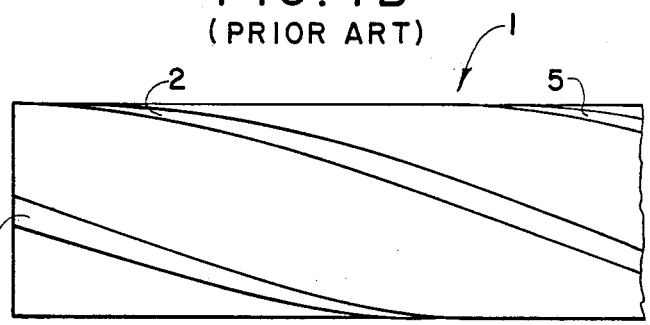
Figure 2:
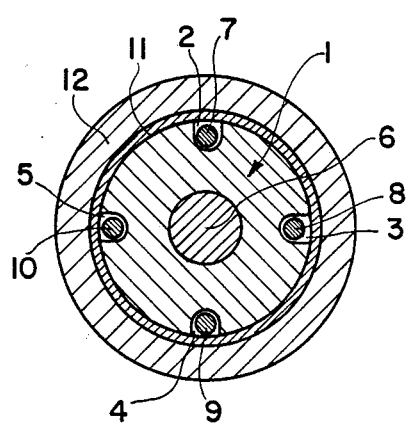
FIG. 2 is a cross-sectional view of the prior art spacer-type optical fiber cable.
Figure 2:
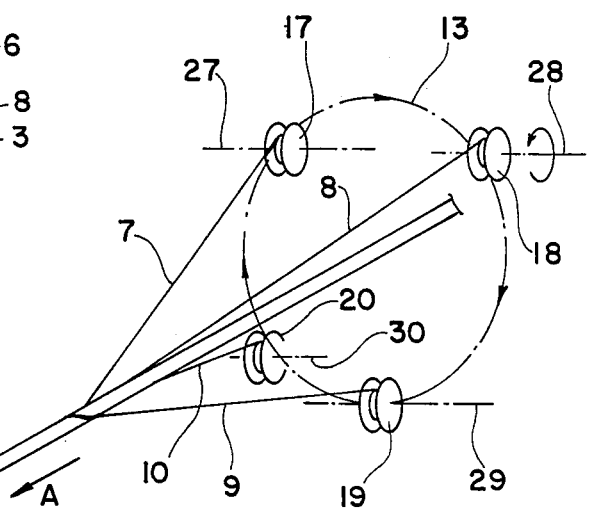

FIG. 1A is a cross-sectional view and FIG. 1B is a side view of the prior art rod-type spacer included in a spacer-type optical fiber cable. A rod-type spacer 1 has formed on its outer circular surface a plurality of open spiral grooves 2, 3, 4, 5 in which optical fibers are held. The spacer normally includes a center core formed of a tension member 6. FIG. 2 is a cross-sectional view of the complete prior art optical fiber cable using the rod-type spacer 1 of FIGS. 1A and 1B. The rod-type spacer 1 is covered by a separate tape 11 for holding and sealing optical fibers 7, 8, 9, 10 provided in the corresponding open spiral grooves 2, 3, 4, 5. This structure is then coated with a separate plastic member to form an outer sheath 12.

Figure 3:
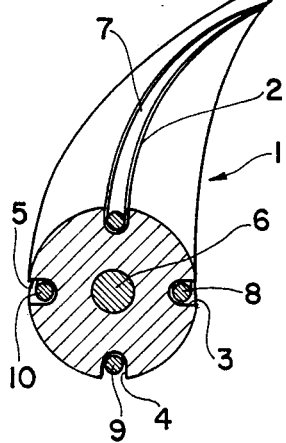
FIG. 3 is a schematic view illustrating how optical fibers are arranged in open spiral grooves on a rod-type spacer of the prior art optical fiber cable.

FIG. 3 is a schematic view illustrating how to arrange the optical fibers in the spiral grooves on the rod-type spacer of the prior art optical fiber cable described above and shown in FIG. 2. In FIG. 3, nonessential parts are omitted for a better understanding of the basic manufacturing steps. The optical fibers 7, 8, 9, 10 are respectively wound around corresponding bobbins 17, 18, 19, 20. The bobbins themselves are rotatable by corresponding power-driven shafts 27, 28, 29, 30. The bobbins 17, 18, 19, 20 are also caused to revolve in a circular orbit 13 around the spacer 1. The spacer 1 is fed in the direction of the arrow A at a velocity compatible with the bobbins' orbital revolution rate from which the ends of the fibers are fed to the spacer. As a result, the optical fibers 7, 8, 9, 10 are respectively arranged within the open spiral grooves 2, 3, 4, 5.

In the prior art manufacturing process shown in FIG. 3, mechanisms must be provided for rotatably supporting at the shafts the plurality of bobbins to which the optical fibers are wound and for driving such bobbins orbitally around the spacer. Therefore, the manufacturing consequently requires complicated and large mechanisms.

Thus, the fundamental problems in the above-discussed prior art are the need and reliance upon complicated and large manufacturing assembly mechanisms and having to arrange a plurality of optical fibers in open spiral grooves which are formed on the exterior surface of a circular rod-type spacer and which fibers and grooves all then subsequently have to be sealed.

To eliminate the above problems, the invention employs a flat-type spacer having straight grooves for receiving and holding optical fibers and which spacer can then be transformed into a rod-type spacer for an optical fiber cable during manufacturing of the cable.

A preferred embodiment of the optical fiber cable of this invention is explained with reference to FIGS. 4A, 4B and 4C. FIG. 4A is a perspective view and FIG. 4B is a cross-sectional view of a flat-type spacer for the optical fiber cable of this invention. This flat-type spacer is formed and then used in a first step of manufacturing the optical fiber cable. Both FIG. 4A and FIG. 4B show the configuration of this flat-type spacer and how the optical fibers are provided and positioned on the flat-type spacer in the first manufacturing step.

This flat-type spacer 31 has a chain-like series of blocks 33, 34, and end sub-blocks 32, 35 having a sector-shaped cross-section and hinges 36, 37, 38 which flexibly couple together blocks 32, 33, 34 and 35. The spacer 31 has opposite ends constituting the sides 30 and 30' of sub-blocks 32 and 35. Preferably, spacer 31 is formed of a one-piece unified flexible material. In this embodiment, three open grooves 39, 40, 41 are formed along the length of the spacer 31, corresponding to an area between the blocks and above the hinges 36, 37, 38. The optical fibers 42, 43, 44 are arranged or positioned in these grooves 39, 40, and 41. A tension member 45, such as Fiber Reinforced Plastic ("FRP"), is buried or formed inside and along the length of the block 33. As was explained earlier, tension member 45 is provided to protect the optical fibers against bending stresses.

To hold optical fibers 42, 43, 44 in position in the finished optical fiber cable product, the open grooves 39, 40, 41 are going to be formed into closed spaces in a second manufacturing step. Therefore, in this embodiment, each of blocks 33, 34, sub-blocks 32, 35 and hinges 36, 37, 38 form the parts of a cylinder, so that this flat-type spacer 31 can be transformed into a rod-type spacer having a round cross-section as shown in FIG. 4C.

FIG. 4C is a cross-sectional view of a rod-type spacer 31', which is formed from the flat-type spacer 31, during the next manufacturing step. In this step, the spacer 31 is closed by moving the opposite ends 30, 30' of the spacer together in a circular-like movement. Both end sides 30, 30' of the flat-type spacer sub-blocks 32, 35 are joined to each other. By doing so, the joined sub-blocks or half-blocks 32, 35 form another single block. Thus, a flat-type spacer 31 is transformed into a circular rod-type spacer, so that grooves 39, 40, 41 form closed spaces 39', 40', 41' for loosely holding the corresponding optical fibers 42, 43, and 44. In general, an optical fiber cable has a tension member in its center to protect the optical fibers from outside tensions, particularly bending stresses. In this embodiment of the invention, a flat-type spacer 31 has a tension member 45 integrally formed therein on the top portion of one block 33 as shown in FIGS. 4A, 4B. Therefore, when the flat spacer 31 is transformed into a rod-type spacer 31', the rod-type spacer 31' has tension member 45 in the center of it.

Figure 5:
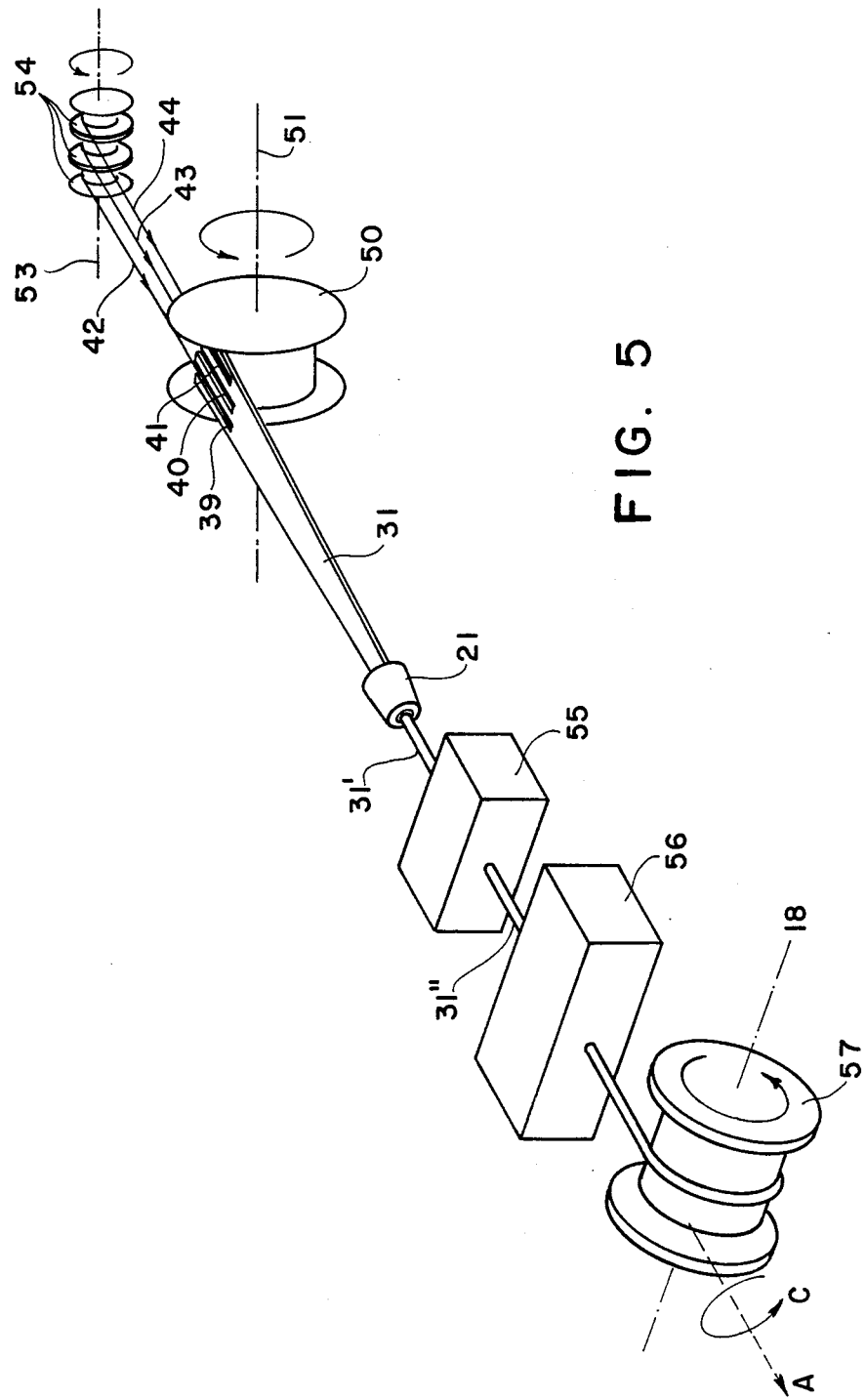
FIG. 5 is a schematic diagram illustrating the overall method of manufacturing a spacer-type optical fiber in accordance with this invention.

FIG. 5 is a schematic diagram, illustrating an overall manufacturing process for making a spacer-type optical fiber cable using the aforementioned flat-type spacer.

As shown in FIG. 5, the flat-type spacer 31 is wound around a spacer bobbin 50 so that the spacer grooves 39, 40, 41 are facing outwardly on the bobbin 50. The bobbin 50 is rotatably supported by a power-driven shaft 51. Moreover, the optical fibers 42, 43, 44 for positioning in the grooves of the flat-type spacer 31 are respectively wound around a fiber bobbin 54. The fiber bobbin 54 is rotatably supported by a power-driven shaft 53. Because a flat-type spacer 31 is employed, the grooves 39, 40, 41 are straight and located on the same plane. Thus, the respective optical fibers 42, 43, 44 to be arranged in these grooves 39, 40, 41 can be provided without orbitally rotating them in a direction 13 or using three separately driven fiber bobbins as required and shown in the prior art manufacturing of FIG. 3. Therefore, it is only necessary to support the fiber bobbin 54 rotatable around the shaft 54. In addition, the manufacturing process can be realized only by forwardly pulling the flat-type spacer 31 in the manner shown by FIG. 5 where the spacer bobbin 50 and fiber bobbin 14 are rotatable only in one direction Thus, the manufacturing assembly mechanisms and process can be significantly simplified. It is, of course, possible to provide suitable braking means, for example a coil spring, for giving a back tension to a bobbin, thus preventing the spacer bobbin 50 and fiber bobbin 54 from overrunning the optical fibers in relationship to the spacer.

Further discussion as to the means and how to transform a flat-type spacer 31 into a rod-type spacer 31' by an assembling die will be provided with reference to FIGS. 6A, 6B, and FIGS. 7A, 7B, 7C.

Figure 6A:
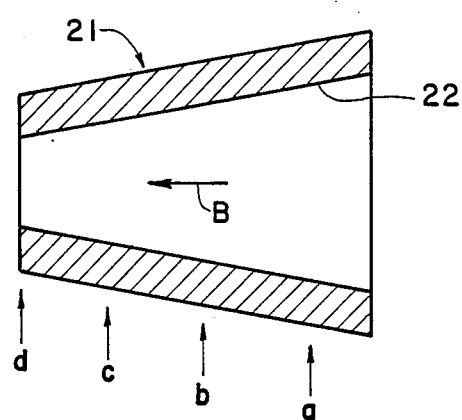
FIGS. 6A and B are respectively side-sectional and cross-sectional views of an assembling die used in manufacturing the spacer-type optical fiber in accordance with the invention.
Figure 6B:
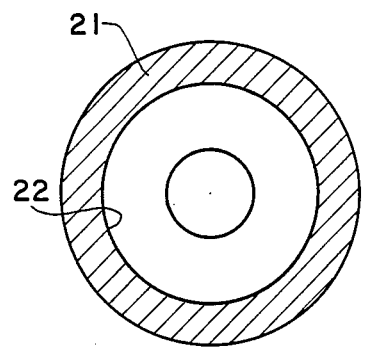

FIG. 6A is a side-sectional view and FIG. 6B is a cross-sectional view of an assembling die 21, which is used for transforming a flat-type spacer 31 into a rod-type spacer 31' in the second manufacturing step. As shown in FIGS. 6A, 6B, this assembling die is a tapered cylindrical die 21 and has the diameter of an internal wall surface 22 gradually reduced in the arrow direction B. A flat-type spacer 31 is passed through the tapered cylindrical bore of the internal wall surface 22 in the same direction B. Employing a tapered die 21 makes a flat-type spacer pass through it smoother than just merely a straight cylindrical or ring die.

Figure 7A:
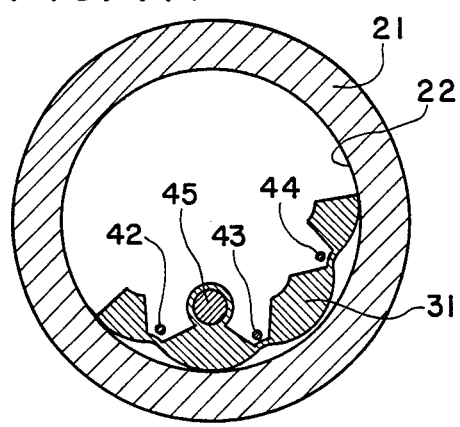
FIGS. 7A, 7B and 7C are cross-sectional views, taken along different points in the die shown in FIG. 6A, illustrating how a flat-type spacer acts within the assembling die during manufacture of the optical fiber cable in accordance with the invention.
Figure 7B:
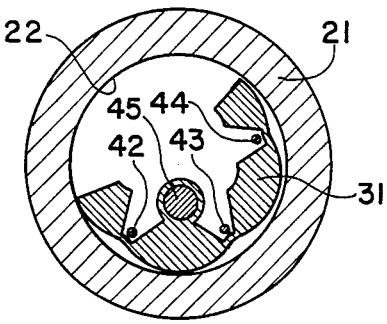
Figure 7C:
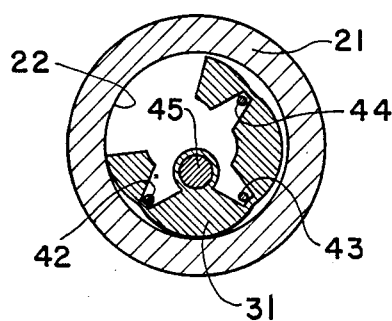

FIGS. 7A, 7B and 7C are cross-sectional views, taken at corresponding points a, b, and c shown in FIG. 6A, illustrating in particular the sequential actions on the flat-type spacer 31 within the tapered die 21. FIG. 4B illustrates the condition of the spacer after passing through the end of the die 21 shown as point d in FIG. 6A. With the decreasing internal diameter of the die 21, the opposite ends of the flat-type spacer 31 are gradually moved together along the internal wall surface 22 of die 21 and thus converted into a rod-type spacer 31' having a round cross-section after passing the die 21. When the flat-type spacer is changed into a rod type spacer as shown in FIG. 4B, each groove 39, 40, 41 is closed inside of the rod-type spacer 31 so as to form closed spaces 39', 40' and 41'. During the above-mentioned first and second manufacturing steps, the optical fibers 42, 43, 44 are kept arranged in the grooves 39, 40, 41 so that the optical fibers are housed within respective closed spaces 39', 40', 41' one by one.

As explained with reference to FIGS. 1, 2, 3, optical fibers held in an optical cable must run in a spiral path along the longitudinal axis of it. Thus, in accordance with the invention and as shown in FIG. 5 for the preferred embodiment, a third manufacturing step is employed.

After passing through the die 21, the rod-type spacer 31' is heated by a heater 55 in order to twist it in the direction shown by arrow C, so that the closed spaces 39', 40', 41' run in a spiral path along the longitudinal axis of the rod-type spacer. The rod-type spacer is moved in the direction A and eventually wound around a single bobbin 57 as part of the finished optical fiber cable product. Therefore, in addition to the single bobbin 57 being rotatably supported by power-driven shaft 58, the bobbin 57 can also be rotatably supported, at the same time, in the direction of arrow C in order to twist the rod-type spacer.

It is also possible as an alternative embodiment of the manufacturing process to provide a heater in or with the die to eliminate the separate heater 55 or heating step thereof. In this case, both the manufacturing steps of forming the rod-type spacer from the flat-type spacer and heating the rod-type spacer are performed at the same time.

Figure 8:
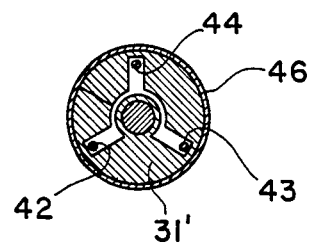
FIG. 8 is a cross-sectional view of a embodiment of an optical fiber cable made in accordance with this invention.

Preferably, and as shown in FIG. 5, to secure the rod-type spacer 31' tightly together, the spacer 31' can be wrapped with a tape around it by a wrapping mechanism 56 after passing through the die 21 and heater 55. The wrapped rod-type spacer, if necessary, is coated with a sheath 46 around it, as shown in FIG. 8, to be more resistive to bending stresses. It is also considered that the plastic sheath 46 can constitute or substitute for the tape to tightly secure the spacer 31' as described above.

In the above embodiment, a high density polyethylene is, for example, one of materials for the flat-type spacer of the optical fiber cable because it can be transformed or modified by adding a force during or shortly after heating. A low density polyethylene is, for example, one of materials which can be used for the sheath of the optical fiber cable. Furthermore, instead of a fiber-reinforced plastic, either a stainless wire or a zinc-plated steel wire can be used for the tension member of the optical fiber cable.

Figure 9A:
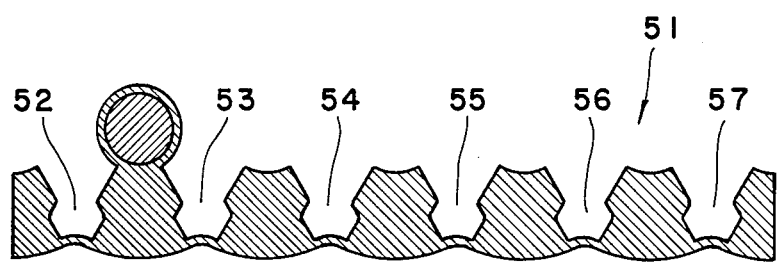
FIG. 9A is a cross-sectional view of another embodiment of a flat-type spacer for forming a rod-type spacer for an optical fiber cable in accordance with this invention.
Figure 9B:
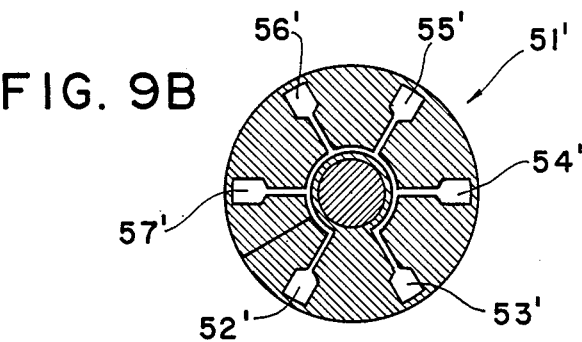
FIG. 9B is a cross-sectional view of a modified rod-type spacer made from the flat-type spacer shown in FIG. 9A for an optical fiber cable in accordance with the invention.

FIGS. 9A and 9B show another embodiment of the optical fiber cable in accordance with the present invention FIG. 9A is a sectional view of a flat-type spacer 51 modified from that flat-type spacer 31 shown in FIG. 4B. FIG. 9B is a cross-sectional view of a rod-type spacer 51' formed from the spacer 51 of FIG. 9A. In the flat-type spacer 51, the six grooves 52, 53, 54, 55, 56, 57 have a different shape because of the differences in the side walls of the adjacent blocks forming the grooves. Therefore, when the rod-type spacer 51' of FIG. 9B is formed, each of the closed spaces 52', 53', 54', 55', 56', 57' becomes relatively smaller. As a result, the movement of the optical fibers in the corresponding closed spaces is more limited. Thus, the optical fibers can be held more stably.

Figure 10A:
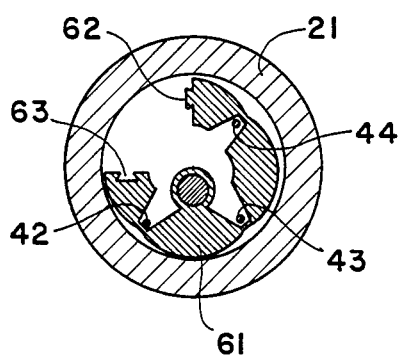
FIGS 10A and 10B are sectional views of a further modification of the flat-type spacer shown in FIG. 7C and the rod-type spacer shown in FIG. 4C, illustrating in particular means for unifying the ends of the flat-type spacer in the assembling die during manufacturer of an optical fiber cable in accordance with the invention.
Figure 10B:
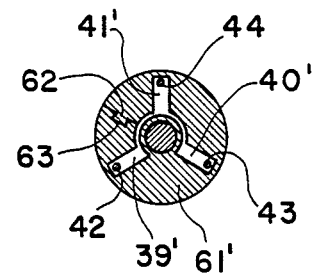

Moreover, instead of wrapping a tape around a rod-type spacer to tighten it after passing the die, another modified structure for the flat-type spacer can be employed as illustrated in FIGS. 10A and 10B. Both FIGS. 10A and 10B are sectional views, similar to those of FIG. 7C and FIG. 4C respectively, but showing the modified structure of a flat-type spacer 61 and rod-type spacer 61'

In this embodiment, a male member 62 is provided at one of the ends of the flat-type spacer 61, and a female member 63 is provided at the other end of the spacer 61. When this flat-type spacer is passed through the die 21, the male member 62 engages with the female member 63. Thus, a rod-type spacer 61' is formed as shown in FIG. 10B. The mating of the male and female members 62 and 63 tightly secures the rod-type spacer 61' together. Depending on cost, further wrapping with a tape around this rod-type spacer, of course, is possible but not essential.

In view of the foregoing written description of the preferred embodiments and accompanying drawings, it can be seen that both the structure of a spacer-type optical fiber cable and the related manufacturing process have been simplified and improved. It can be further seen that the optical fiber cable can be formed with different numbers of grooves for the optical fibers. It also can be seen that optical fibers do not have to be provided in all of the formed grooves. For example, a tension member could be positioned in one of the empty grooves. Thus, it is intended that the present invention cover the modifications and variations of this invention within the scope of the appended claims and their equivalents.

What is claimed is:

1. A method of making an optical fiber cable, comprising the steps of:
   (a) providing a flat-type spacer having a straight groove along a length thereof and positioning an optical fiber therein along substantially the same plane; and
   (b) forming the straight groove into a closed space in which the optical fiber is held, by transforming the flat-type spacer into a circular rod-type spacer while the optical fiber remains positioned in the groove.

2. A method according to claim 1, further comprising after step (b) the step of:
   (c) twisting the rod-type spacer so that the optical fiber takes a spiral-like path along the longitudinal length of the rod-type spacer.

3. A method according to claim 2, further comprising before step (c) the step of:
   heating the transformed rod-type spacer.

4. A method according to claim 1, wherein step (b) comprises:
   guiding the flat-type spacer into a cylindrical die,
   passing the flat spacer through the cylindrical die, and
   outputting the transformed rod-type spacer from the cylindrical die.

5. A method according to claim 4, wherein the cylindrical die has a tapered internal diameter which gradually reduces in the moving direction of the flat-type spacer.

6. A method according to claim 4, further comprising after step (b) the step of:
   wrapping a tape around the rod-type spacer which is output from the cylindrical die.

7. A method according to claim 4, further comprising after step (b) the steps of:
   winding the rod-type spacer around a bobbin, and
   rotating the bobbin around in an orbital and longitudinal moving direction of the rod-type spacer substantially at the same time.

8. A method according to claim 4, further comprising the step of heating the spacer when the flat-type spacer is being passed through the die and transformed into the rod-type spacer.

9. A method according to claim 4, further comprising the step of securing together the rod-type spacer when the flat-type spacer is being passed through the die and transformed into the rod-typed spacer.

10. A method according to claim 9 further comprising, after step (b) the step of:
    forming an outer sheath around the rod-type spacer.

11. An optical fiber cable, comprising:
    (a) a plurality of optical fibers;
    (b) spacer means, for holding and protecting the optical fibers in closed spaces, the spacer means including a plurality of section blocks connected together to form a plurality of closed spaces between adjacent blocks in which the optical fibers are positioned; and,
    (c) a tension member positioned in the center of the spacer means and formed within a portion of one of the blocks.

12. An optical fiber cable according to claim 11, wherein the spacer means further includes hinge means for connecting adjacent blocks together.

13. An optical fiber cable according to claim 11, wherein the blocks have sector-shaped cross-sections to form a cylindrical rod-type spacer.

14. An optical fiber cable according to claim 12, wherein the blocks have sector-shaped cross-sections to form a cylindrical rod-type spacer.

15. An optical fiber cable according to claim 14, wherein the section blocks and hinge means are formed of a single piece of material.

16. An optical fiber cable according to claim 13, wherein a pair of adjacent blocks have means integrally formed therewith for holding together the blocks forming the rod-type spacer.

17. An optical fiber cable according to claim 11, further comprising:
    a tape, wrapped around the spacer means, for preventing the connected blocks from separating.

18. An optical fiber cable according to claim 11, further comprising:
    a sheath, formed around the spacer means, for protecting the spacer means against an external force.

19. An optical fiber cable, comprising:
    (a) a plurality of optical fibers; and
    (b) a rod-type spacer, having along a length thereof a plurality of closed spaces for holding the optical fibers, the closed spaces being formed from a plurality of open grooves on a flat-type spacer by transforming the flat-type spacer into the rod-type spacer.

20. An optical fiber cable, comprising:
    (a) plurality of optical fibers; and
    (b) spacer means, for holding and protecting the optical fibers in closed spaces, the spacer means including a plurality of section blocks connected together to form a plurality of closed spaces between adjacent blocks in which the optical fibers are positioned, wherein the blocks have sector-shaped cross-sections to form a cylindrical rod-type spacer and wherein a pair of adjacent blocks have means intricately formed therewith for holding together the blocks forming the rod-type spacer.

* * * * *